J. M. BROWN.
Neck-Yoke.
No. 7,435.  Patented June 18, 1850.
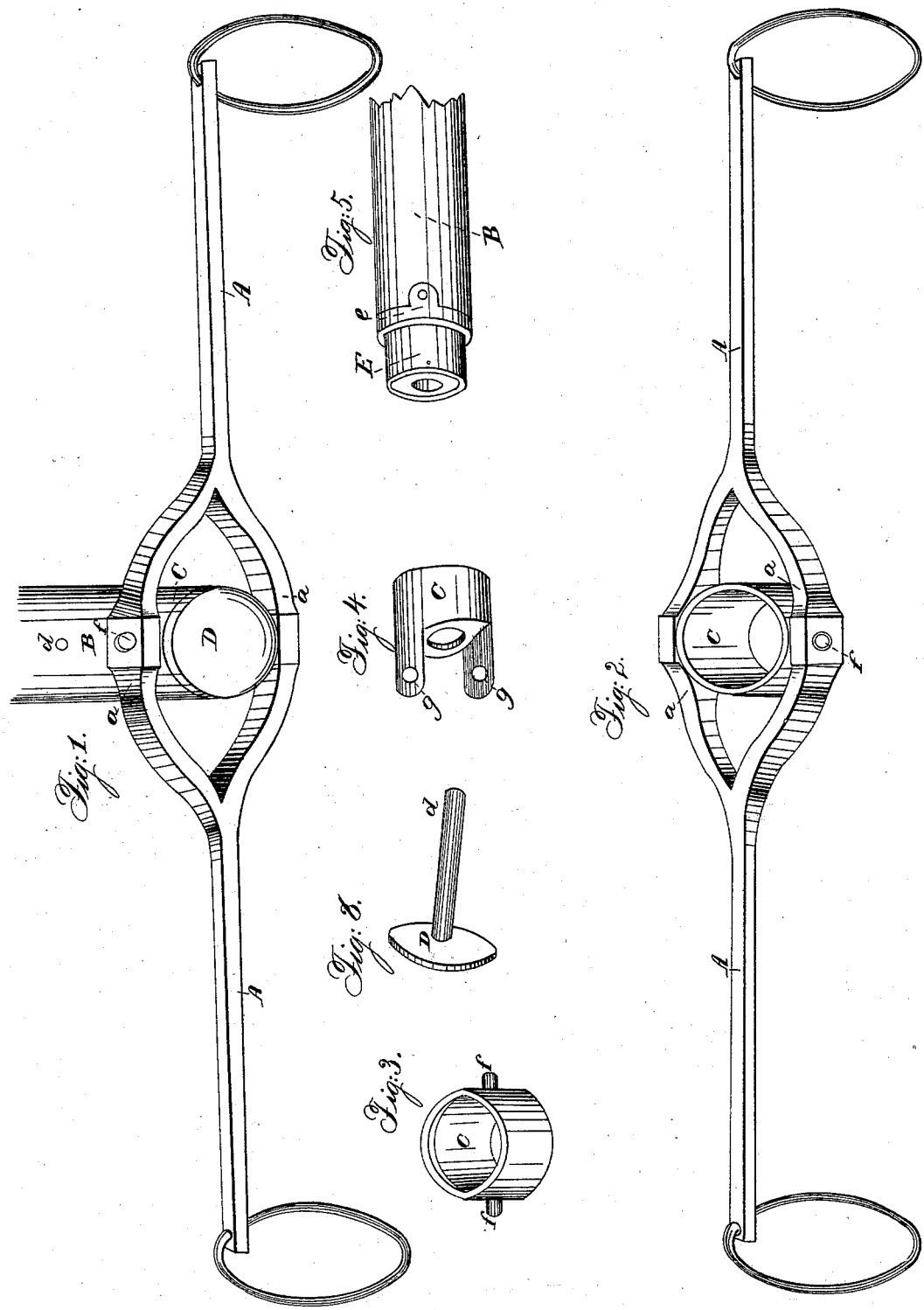

UNITED STATES PATENT OFFICE.

JAMES M. BROWN, OF BLOOMFIELD, OHIO.

ATTACHING NECK-YOKES TO POLES OF CARRIAGES.

Specification of Letters Patent No. 7,435, dated June 18, 1850.

*To all whom it may concern:*

Be it known that I, JAMES M. BROWN, of Bloomfield, in the county of Trumbull and State of Ohio, have invented a new and useful Improvement in the Manner of Constructing a Neck-Yoke for Carriages, Wagons, &c., and the Manner of Connecting the Same to the Tongue or Pole of Such Carriage; and I do hereby declare that the following is a full, clear, and exact description of the construction and operation of the same, reference being had to the annexed drawings, making a part of this specification, in which—

Figure 1 is a perspective view of the yoke and tongue connected, with the movable band, bolt, &c., complete. Fig. 2 is the yoke and band. Fig. 3 is the band. Fig. 4 is another kind of movable band. Fig. 5 is the end of the tongue, and Fig. 6 is the bolt.

The same letters indicate the same parts in all the different figures.

In Fig. 1, A A is the neck yoke, $a, a,$ being the upper end under parts of the yoke as it is divided. B, is the pole or tongue of the carriage. C is a movable band (shown in Fig. 3). D is a bolt (shown in Fig. 6) which secures the band in its place and being itself fastened by a pin or screw at $d$. One of two knobs upon the movable band is shown at $f$.

Fig. 2 exhibits the yoke A, A, divided into parts $a, a$. And also the movable band C, one of the knobs on which the yoke works being at $f$.

Fig. 3 shows the movable band C having on each side at $f, f,$ projecting knobs on which the yoke works.

Fig. 4 is another form of movable band which may be secured upon the pole or tongue of the carriage in the same manner as the band in Fig. 3, but to be used with a solid yoke, instead of a divided one, working upon a bolt made to pass through both the yoke, and the two projecting parts of the band at $g, g$.

Fig. 5 is the end of the pole or tongue of a carriage upon which is a ferrule of iron, E, secured by screws or nails at the projections $e$. The band C, (which is made of brass or iron,) turns freely upon this ferrule.

Fig. 6 is the bolt D, which having a head of suitable size, secures the movable band in its place by being put into the end of the tongue and there fastened, as before explained.

The parts herein described may be elegantly constructed of brass and iron or the whole may be cheaply made of cast iron alone. Properly constructed and put together as shown in Fig. 1 it forms a universal joint and will be found by all who are judges of the thing, superior to any device heretofore in use.

The manner of attaching this yoke to the tongue of the carriage is compact, neat and durable.

I do not claim the universal joint merely of itself but:

What I claim as my invention and desire to secure by Letters Patent is—

The mode herein described of constructing the neck yoke (either solid or divided) and fitting the tongue or pole of the carriage, and these, so constructed and fitted, in combination with the movable band on which are projections as in Fig. 4, or knobs as in Fig. 3, by which means the whole are securely connected and thus form a universal joint for the purpose stated and not otherwise.

JAMES M. BROWN.

Witnesses:
   J. BIGELOW,
   JOHN J. CANNON.